E. S. SUTCH.
WORM DRIVE FOR AUTOMOBILES.
APPLICATION FILED AUG. 6, 1914.
1,163,483.
Patented Dec. 7, 1915.
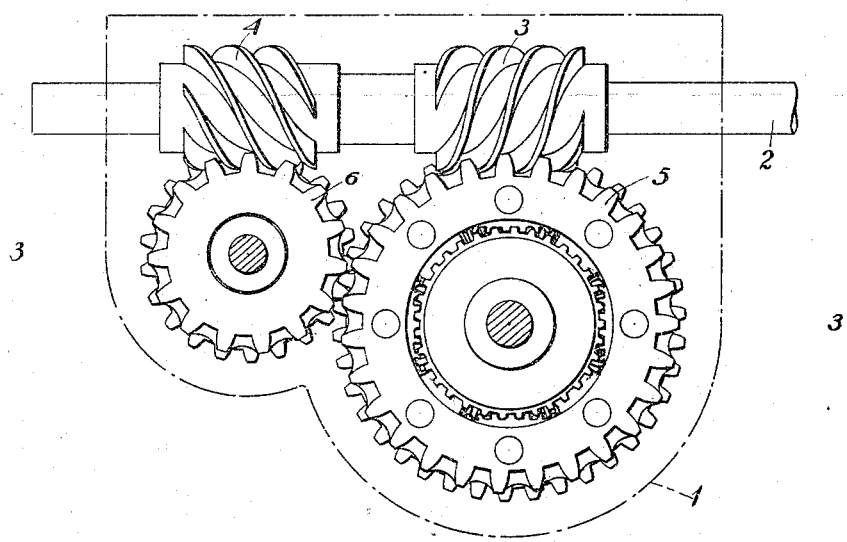
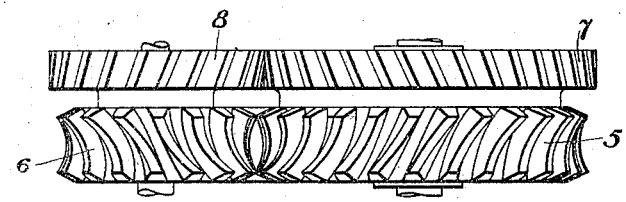
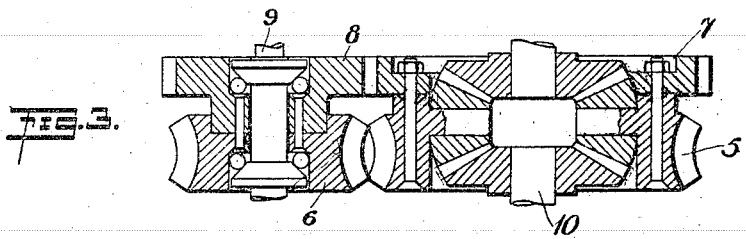
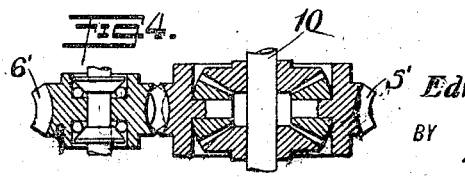
WITNESSES
G. Robert Thomas
A. L. Kitchin
INVENTOR
Edwin S. Sutch.
BY Munn & Co
ATTORNEYS

UNITED STATES PATENT OFFICE.

EDWIN S. SUTCH, OF PHILADELPHIA, PENNSYLVANIA.

WORM-DRIVE FOR AUTOMOBILES.

1,163,483. Specification of Letters Patent. Patented Dec. 7, 1915.

Application filed August 6, 1914. Serial No. 855,399.

*To all whom it may concern:*

Be it known that I, EDWIN S. SUTCH, a citizen of the United States, and a resident of Philadelphia, in the county of Philadelphia and State of Pennsylvania, have invented a new and Improved Worm-Drive for Automobiles, of which the following is a full, clear, and exact description.

This invention relates to improvements in differential driving mechanism, and has for an object to provide an improved construction wherein a worm will act as a power member without producing undesired end or side thrusts.

Another object in view is to provide a pair of oppositely acting worms and oppositely acting worm gears meshing therewith, said worm gears being connected by power gears whereby the thrust of the worms will counteract each other, and the power used in rotating the worm gears.

A still further object in view is to provide a worm gear drive for automobiles or other devices which utilizes a pair of worms and worm gears so as to balance a thrust and a pair of spiral gears for balancing the side thrust of the worm gears whereby no extraordinary stops or housings are necessary for holding the driving mechanism.

In the accompanying drawings—Figure 1 is a side view of part of a differential gear, the same disclosing an embodiment of the invention; Fig. 2 is a top plan view of the various gears shown in Fig. 1; Fig. 3 is a section through Fig. 1 approximately on line 3—3; Fig. 4 is a sectional view similar to Fig. 2 except that the same shows a slightly modified form of the invention, the view being on a reduced scale.

Referring to the accompanying drawings by numerals, 1 indicates a casing of any desired kind which is supported in any desired or usual manner. Extending into the casing 1 is a power shaft 2 which may be connected to the engine in any suitable manner without departing from the spirit of the invention. The power shaft 2 carries worms 3 and 4, which worms are set so as to act in opposition to each other during the rotation of the shaft 2. The shaft 2 may be supported by suitable bearings of any form without the necessity of an end thrust bearing as the worms 3 and 4 act in opposition to each other through the worm gear 5 and the worm pinion 6. The construction on the interior of the worm gear 5 which is in fact nothing but a ring is of the usual construction of differential transmission gears so as to transmit power to the divided shaft extending therethrough in the usual manner, the construction of the differential part of the gearing not forming any part of the invention. It will be noted that associated with the gear 5 is a spiral gear 7 which meshes with a spiral pinion 8, gear 7 being rigidly secured by rivets, bolts or other means to gear 5, while pinion 8 is similarly secured to pinion 6. The pinions 6 and 8 are held in position by a suitable shaft 9 with the ends extending into casing 1 for properly supporting the same. As shown in Fig. 3 suitable bearings are provided for the pinions 6 and 8 whereby the same is allowed a free rotative movement. It will be noted that the teeth of gears 7 and 8 are set so as to give a side thrust in an opposite direction to the side thrust of gear 5 and pinion 6, whereby the respective side thrusts are neutralized. By the particular arrangement of the worms 3 and 4 the end thrust of the shaft 2 is neutralized. In forming a neutralized thrust drive as just described and neutralized side thrusts to the respective gears means are provided which may be easily mounted in place, and which will transmit power to the divided shaft in the usual manner.

In Fig. 4 of the drawings a slightly modified form of the invention is disclosed in which the worm gears 5' and 6' are arranged to mesh so as not to require the use of the extra gears 7 and 8. By this construction and arrangement it will be observed that the power may be transmitted to the driving shaft 10 directly or indirectly as shown in Fig. 2 where the power is transmitted to the extra gears 7 and 8.

The worm drive as described and shown refers to a drive for an automobile as it is especially adapted therefor, but it is evident that the drive may be used in connection with other machines without in any way departing from the spirit of the invention as the respective worms and gears will balance wherever placed.

What I claim is—

1. In a drive mechanism, a pair of oppositely pitched worms, a worm gear meshing with each of said worms, and a pair of oppositely pitched spiral gears continually meshing, the spiral gears having a side thrust in opposition to the side thrust of the worm gears.

2. In a worm drive for automobiles and the like, a power shaft, a pair of worms having opposite spirality arranged on the power shaft, a worm gear meshing with each of said worms, means connecting the gear wheels so that the gear wheels will act together, said means causing a side thrust in an opposite direction to the side thrust produced by said worm gears, and means connected with one of the gears for transmitting power therefrom.

3. In a drive mechanism for automobiles and the like, a pair of worm gears, a pair of oppositely arranged worms for rotating said worm gears, means for driving said worms at the same speed, and a spiral gear wheel connected with each of said worm gears, said spiral gear wheels continually meshing, said spiral gears having an opposite spirality to the worm gears.

In testimony whereof I have signed my name to this specification in the presence of two subscribing witnesses.

EDWIN S. SUTCH.

Witnesses:
HARRY E. DARR,
JAMES P. CULLEN, Jr.